United States Patent
Sherigar et al.

(10) Patent No.: US 11,323,022 B2
(45) Date of Patent: May 3, 2022

(54) SYSTEM FOR CONTROLLING INDUCTOR CURRENT OF BOOST CONVERTER

(71) Applicant: NXP B.V., Eindhoven (NL)

(72) Inventors: Arvind Sherigar, Bangalore (IN); Samiran Dam, Bangalore (IN); Ashutosh Ravindra Joharapurkar, Bangalore (IN)

(73) Assignee: NXP B.V., Eindhoven (NL)

( * ) Notice: Subject to any disclaimer, the term of this patent is extended or adjusted under 35 U.S.C. 154(b) by 194 days.

(21) Appl. No.: 16/886,348

(22) Filed: May 28, 2020

(65) Prior Publication Data
US 2021/0376725 A1    Dec. 2, 2021

(51) Int. Cl.
*H02M 1/36* (2007.01)
*H02M 3/158* (2006.01)
*H02M 3/157* (2006.01)

(52) U.S. Cl.
CPC ............ *H02M 1/36* (2013.01); *H02M 3/157* (2013.01); *H02M 3/158* (2013.01)

(58) Field of Classification Search
CPC ........ H02M 3/158; H02M 1/36; H02M 3/157; H02M 3/156; H02M 1/4225
See application file for complete search history.

(56) References Cited

U.S. PATENT DOCUMENTS

| | | | |
|---|---|---|---|
| 7,030,596 B1 * | 4/2006 | Salerno | H02M 3/158 323/282 |
| 7,719,248 B1 * | 5/2010 | Melanson | H02M 1/4225 323/283 |
| 7,923,973 B2 * | 4/2011 | Odell | H02M 3/156 323/284 |
| 7,977,926 B2 * | 7/2011 | Williams | H02M 3/1582 363/127 |
| 8,519,691 B2 | 8/2013 | McCloy-Stevens | |
| 2007/0210772 A1 * | 9/2007 | Sawtell | H02M 3/156 323/282 |
| 2008/0088292 A1 * | 4/2008 | Stoichita | H02M 3/156 323/285 |

FOREIGN PATENT DOCUMENTS

WO     2017027393 A1    2/2017

* cited by examiner

*Primary Examiner* — Alex Torres-Rivera

(57) ABSTRACT

A system for controlling an inductor current of a boost converter includes a start-up controller that is configured to generate a control signal that has a fixed on-time duration and a dynamic off-time duration that decreases with each cycle of the control signal, and a pulse width modulation (PWM) circuit that is configured to generate a PWM signal. During a start-up of the boost converter, the PWM signal transitions from a deactivated state to an activated state when the control signal is activated, and from an activated state to a deactivated state when the inductor current is equal to a reference current. The reference current corresponds to a peak value of the inductor current during the start-up. Thus, during the start-up, the duty cycle of the PWM signal increases with each cycle of the PWM signal. The PWM signal is provided to the boost converter for controlling the inductor current.

20 Claims, 5 Drawing Sheets

SYSTEM FOR CONTROLLING INDUCTOR CURRENT OF BOOST CONVERTER

BACKGROUND

The present disclosure relates generally to electronic circuits, and, more particularly, to a system for controlling an inductor current of a boost converter.

Boost converters are widely utilized in a variety of electronic devices such as automotive devices, mobile devices, or the like. A boost converter is a direct current (DC) to DC converter that converts a DC input voltage to a DC output voltage such that the DC output voltage is greater than the DC input voltage. The DC output voltage is generated based on an inductor current of an inductor of the boost converter. The inductor current is controlled based on charging and discharging of the inductor. Typically, during a start-up of the boost converter, the inductor is charged at a rate that is significantly greater than a discharging rate of the inductor. As a result, magnetic charge builds up in the inductor leading to a significant increase in the inductor current of the boost converter. This inductor current is referred to as an inrush current.

The inrush current is significantly greater than a steady-state inductor current (i.e., the inductor current during a steady-state operation of the boost converter). As a result, to prevent saturation of the inductor, the saturation current of the inductor is required to be greater than the inrush current, which in turn leads to a significant increase in sizes and manufacturing costs of the inductor, the boost converter, and a printed circuit board (PCB) that includes the boost converter. The sizes of the boost converter and the PCB further increase due to the design of integrated switches and metallization that facilitate passage of the inrush current in the boost converter. One solution to solve the aforementioned problem includes utilizing a system that is coupled with the boost converter for reducing the inrush current of the boost converter. The system includes an off-chip capacitor that facilitates the reduction in the inrush current by controlling the charging and discharging of the inductor during the start-up. However, the utilization of the off-chip capacitor in the system results in a large size and a high manufacturing cost of the system, which in turn adds to the size and the manufacturing cost of the PCB. Therefore, there exists a need for a system that solves the aforementioned problems of conventional boost converters as well as conventional systems that control the inrush current of the boost converters.

SUMMARY

In one embodiment, a system for controlling an inductor current of a boost converter is disclosed. The system includes a start-up controller that is configured to generate a first control signal. The first control signal is generated such that an on-time duration of the first control signal is fixed and an off-time duration of the first control signal is dynamic. The system further includes a pulse width modulation (PWM) circuit that is coupled with the start-up controller and the boost converter. The PWM circuit is configured to receive the first control signal, and a first comparison signal that is generated based on a comparison of the inductor current and a reference current. The PWM circuit is further configured to generate and provide a PWM signal to the boost converter to control the inductor current of the boost converter. During a start-up of the boost converter, the PWM signal transitions from a deactivated state to an activated state when the first control signal is activated, and from an activated state to a deactivated state when the first comparison signal is activated.

In another embodiment, an electronic circuit board is disclosed. The electronic circuit board includes a boost converter and a system that is configured to control an inductor current of the boost converter. The system includes a start-up controller and a pulse width modulation (PWM) circuit. The start-up controller is configured to generate a first control signal such that an on-time duration of the first control signal is fixed and an off-time duration of the first control signal is dynamic. The PWM circuit is coupled with the start-up controller, and is configured to receive the first control signal. The PWM circuit is further configured to receive a first comparison signal. The first comparison signal is generated based on a comparison of the inductor current and a reference current. Further, the PWM circuit is coupled with the boost converter, and is configured to generate and provide a PWM signal to the boost converter to control the inductor current of the boost converter. The PWM signal is generated such that during a start-up of the boost converter, the PWM signal transitions from a deactivated state to an activated state when the first control signal is activated, and from an activated state to a deactivated state when the first comparison signal is activated.

In some examples, the PWM circuit of the system is further configured to receive a second control signal, a second comparison signal, and a first latch signal. The second control signal has a fixed on-time duration and a fixed off-time duration, and the second comparison signal is generated based on the inductor current and input and output voltages associated with the boost converter. The first latch signal is indicative of a completion of the start-up. The first latch signal is deactivated during the start-up, and activated after the completion of the start-up. The PWM signal is further generated based on the second control signal, the second comparison signal, and the first latch signal. The PWM signal is generated such that after the completion of the start-up and prior to a steady-state operation of the boost converter, the PWM signal is activated and deactivated when the second control signal is activated and deactivated, respectively. Further, during the steady-state operation of the boost converter, the PWM signal transitions from a deactivated state to an activated state when the second control signal is activated, and from an activated state to a deactivated state when the second comparison signal is activated.

In some examples, the system further includes an analog-to-digital converter (ADC), a look-up-table (LUT) that is coupled with the ADC, and a pulse generator that is coupled with the LUT. The ADC is configured to receive the input voltage associated with the boost converter, and generate an ADC output signal. The LUT is configured to receive the ADC output signal, and output a LUT output signal. The pulse generator is configured to receive the LUT output signal and first and second clock signals, and generate the second control signal. The second control signal is generated such that a frequency of the second control signal is equal to a frequency of the second clock signal, and the fixed on-time duration and the fixed off-time duration of the second control signal are determined based on the LUT output signal and the first and second clock signals.

In some examples, the system further includes a first comparator that is configured to receive a sense signal and a first reference signal that are derived from the inductor current and the reference current, respectively, and compare the sense signal and the first reference signal to generate the first comparison signal. The first comparison signal is activated when a voltage level of the sense signal is greater than or equal to a voltage level of the first reference signal, and deactivated when the voltage level of the sense signal is less than the voltage level of the first reference signal.

In some examples, the system further includes a second comparator that is configured to receive a ramp signal that is derived from the sense signal, and a compensation signal that is derived from the input and output voltages associated with the boost converter. The second comparator is further configured to compare the ramp signal and the compensation signal to generate the second comparison signal. The second comparison signal is activated when a voltage level of the ramp signal is greater than or equal to a voltage level of the compensation signal, and deactivated when the voltage level of the ramp signal is less than the voltage level of the compensation signal.

In some examples, the system further includes a first multiplexer that has a first input terminal that is coupled with the start-up controller, and is configured to receive the first control signal, and a second input terminal that is configured to receive the second control signal. A select terminal of the first multiplexer is configured to receive the first latch signal. The first multiplexer further has an output terminal that is coupled with the first and second comparators, and is configured to output, based on the first latch signal, one of the first and second control signals as a first multiplexer output signal. The output terminal of the first multiplexer is further configured to provide the first multiplexer output signal to the first and second comparators to control operations of the first and second comparators.

In some examples, the system further includes a third comparator and a first latch that is coupled with the third comparator. The third comparator is configured to receive a third reference signal and a voltage divided signal that is generated such that a voltage level of the voltage divided signal is less than a difference between the input and output voltages associated with the boost converter. The third comparator is further configured to compare the third reference signal and the voltage divided signal to generate a third comparison signal. The third comparison signal is activated when the voltage level of the voltage divided signal is equal to or greater than a voltage level of the third reference signal, and deactivated when the voltage level of the voltage divided signal is less than the voltage level of the third reference signal. The first latch has a first input terminal that is coupled with ground. The first latch further has a second input terminal that is coupled with the third comparator, and is configured to receive the third comparison signal. Further, an output terminal of the first latch is configured to generate the first latch signal. The first latch signal transitions from a deactivated state to an activated state when the third comparison signal is activated.

In some examples, the PWM circuit includes second and third multiplexers. The second multiplexer has first and second input terminals that are configured to receive the first and second comparison signals, respectively, and a select terminal that is configured to receive the first latch signal. The second multiplexer further has an output terminal that is configured to output, based on the first latch signal, one of the first and second comparison signals as a second multiplexer output signal. The third multiplexer has a first input terminal that is coupled with the start-up controller, and is configured to receive the first control signal, and a second input terminal that is configured to receive the second control signal. A select terminal of the third multiplexer is configured to receive the first latch signal. The third multiplexer further has an output terminal that is configured to output, based on the first latch signal, one of the first and second control signals as a third multiplexer output signal.

In some examples, the PWM circuit further includes a second latch and a logic gate. The second latch has first and second input terminals that are coupled with the output terminals of the second and third multiplexers, and are configured to receive the second and third multiplexer output signals, respectively, and an output terminal that is configured to generate a second latch signal. The logic gate has first and second input terminals that are coupled with the output terminals of the third multiplexer and the second latch, and are configured to receive the third multiplexer output signal and the second latch signal, respectively. The logic gate further has an output terminal that is coupled with the boost converter, and is configured to generate and provide the PWM signal to the boost converter.

In some examples, the start-up controller includes a first up counter, a down counter, and a fourth comparator. The first up counter is configured to receive the first clock signal, and generate a first count. The down counter is configured to receive the second clock signal, and generate a second count. The first count is incremented during each clock cycle of the first clock signal, whereas the second count is decremented during each clock cycle of the second clock signal. A frequency of the second clock signal is less than a frequency of the first clock signal. The fourth comparator is coupled with the first up counter and the down counter, and is configured to receive and compare the first and second counts to generate a fourth comparison signal. The fourth comparison signal is deactivated when the first count is less than the second count, and activated when the first count is greater than or equal to the second count.

In some examples, the start-up controller farther includes a second up counter, a fifth comparator, and a third latch. The second up counter is coupled with the fourth comparator, and is configured to receive the fourth comparison signal and the first clock signal, and generate a third count. The third count is incremented during each clock cycle of the first clock signal, and reset to a first predetermined value when the fourth comparison signal transitions from a deactivated state to an activated state. The fifth comparator is coupled with the first and second up counters, and is configured to receive the third count and a reference count, and compare the third count and the reference count to generate a fifth comparison signal. The fifth comparison signal is deactivated when the third count is less than the reference count, and activated when the third count is greater than or equal to the reference count. The first count is reset to a second predetermined value when the fifth comparison signal transitions from a deactivated state to an activated state. The third latch has first and second input terminals that are coupled with the fifth and fourth comparators, and are configured to receive the fifth and fourth comparison signals, respectively. The third latch further has an output terminal that is configured to generate the first control signal such that when the fourth comparison signal is activated, the on-time duration of the first control signal is fixed as the first control signal is activated. Further, when the fifth comparison signal is activated, the off-time duration of the first control signal is dynamic as the first control signal is deactivated.

In some examples, the inductor current is controlled by way of the PWM signal such that the inductor current increases when the PWM signal is activated, and decreases when the PWM signal is deactivated.

Various embodiments of the present disclosure disclose a system for controlling an inductor current of the boost converter. The system is configured to control the inductor current by way of a pulse width modulation (PWM) signal. The system includes a start-up controller that is configured to generate a first control signal and a PWM circuit that is configured to generate the PWM signal based on the first control signal and a first comparison signal. The PWM circuit is further configured to provide the PWM signal to the boost converter to control the inductor current of the boost converter. The PWM signal is generated such that during a start-up of the boost converter, the PWM signal transitions from a deactivated state to an activated state when the first control signal is activated, and from an activated state to a deactivated state when the first comparison signal is activated. The first control signal is generated such that an on-time duration of the first control signal is fixed and an off-time duration of the first control signal is dynamic. Further, the first comparison signal is generated based on a comparison of the inductor current and a reference current that corresponds to a peak value of the inductor current during the start-up.

Thus, the system of the present disclosure ensures that the peak value of the inductor current is maintained constant during the start-up of the boost converter, and is significantly less than an inrush current of a conventional boost converter (i.e., a boost converter that is not controlled by the system of the present disclosure). Hence, the saturation current of an inductor utilized in the boost converter of the present disclosure is significantly less than that of an inductor utilized in the conventional boost converter. As a result, a size and a manufacturing cost of the inductor utilized in the boost converter of the present disclosure are significantly less than that of the inductor utilized in the conventional boost converter. Consequently, sizes and manufacturing costs of the boost converter of the present disclosure and a printed circuit board (PCB) that includes the boost converter of the present disclosure are significantly less than that of the conventional boost converter and a PCB that includes the conventional boost converter, respectively. Further, the peak value of the inductor current being significantly less than the inrush current of the conventional boost converter facilitates optimization of the design of integrated switches and metallization that are utilized in the boost converter. Additionally, as the system of the present disclosure controls the inductor current of the boost converter of the present disclosure sans an off-chip capacitor, a size and a manufacturing cost of the system are significantly less than that of a conventional system that utilizes an off-chip capacitor for controlling the inrush current of a corresponding boost converter. Thus, the size and the manufacturing cost of the PCB that includes the system and the boost converter of the present disclosure are significantly less than that of a PCB that includes the conventional system and the corresponding boost converter.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
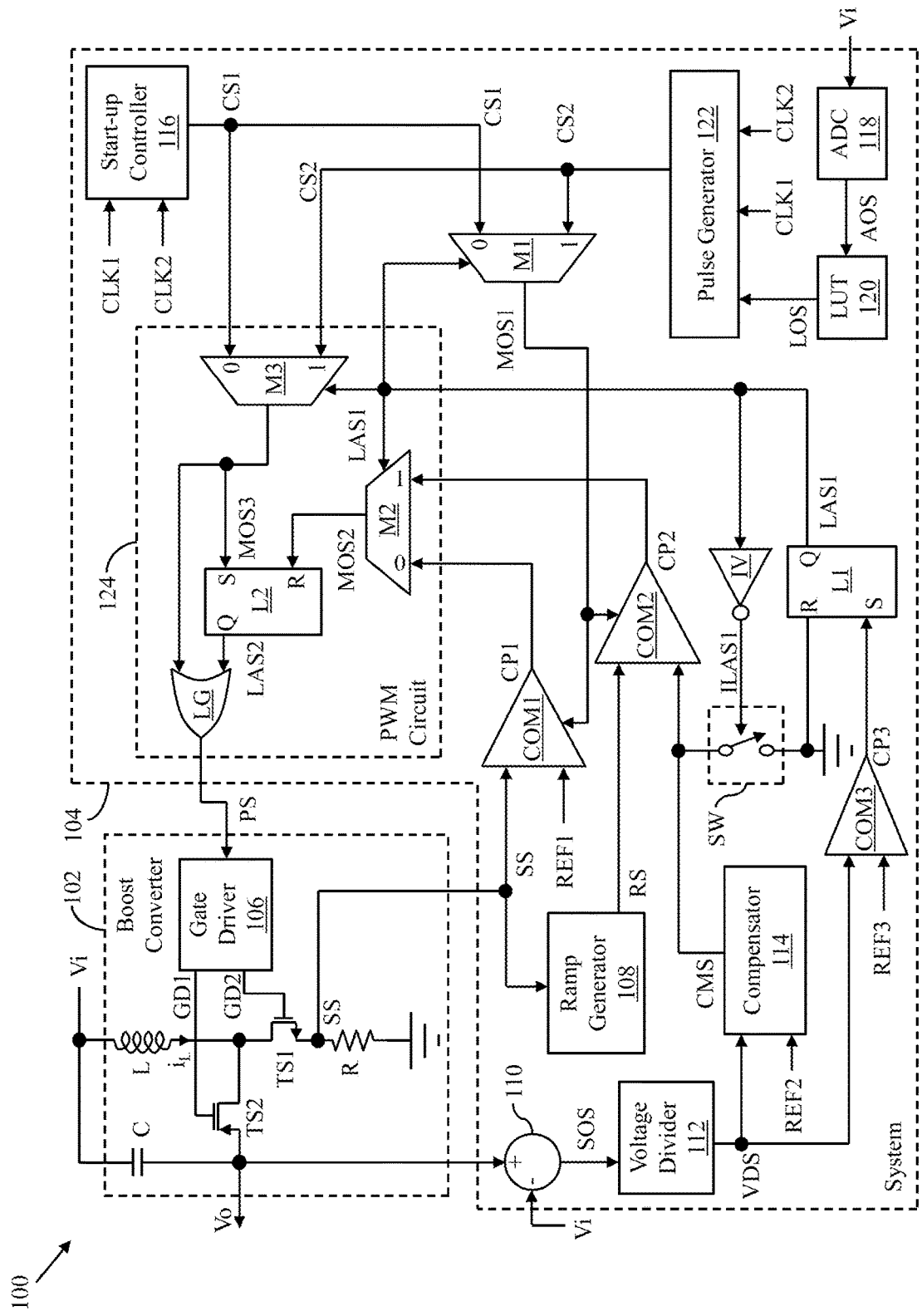
FIG. 1 illustrates a schematic block diagram of a printed circuit board (PCB) in accordance with an embodiment of the present disclosure.

FIG. 1 illustrates a schematic block diagram of a printed circuit board (PCB) 100 in accordance with an embodiment of the present disclosure. The PCB 100 is an electronic circuit board that includes a boost converter 102 and a system 104 that is configured to control an inductor current $i_L$ of the boost converter 102 by way of a pulse width modulation (PWM) signal PS. The PCB 100 may be included in various devices such as automotive devices, mobile devices, network devices, or the like.

The boost converter 102 is configured to receive a direct current (DC) input voltage Vi (hereinafter referred to as an "input voltage Vi"), and generate a DC output voltage Vo (hereinafter referred to as an "output voltage Vo"). The output voltage Vo is generated such that the output voltage Vo is greater than the input voltage Vi. In an example, the output voltage Vo is greater than the input voltage Vi by 6.25 volts (V). The input voltage Vi is generated by a voltage generator (not shown) that is external to the PCB 100. Further, the boost converter 102 is coupled with a functional circuitry (not shown) that is external to the PCB 100, and is configured to provide the output voltage Vo to the functional circuitry for controlling various operations of the functional circuitry. In an example, an operating voltage of the functional circuitry is controlled by way of the output voltage Vo. Examples of the functional circuitry may include processors, amplifiers, or the like.

The boost converter 102 includes an inductor L, a sense resistor R, an output capacitor C, first and second transistors TS1 and TS2, and a gate driver 106. In an embodiment, the first and second transistors TS1 and TS2, the sense resistor R, the gate driver 106, and the system 104 are included on a single system-on-chip (SoC) of the PCB 100, and the inductor L and the output capacitor C are external to the SoC.

The inductor L has a first terminal that is coupled with the voltage generator, and is configured to receive the input voltage Vi, and a second terminal that is coupled with a first terminal of the first transistor TS1. The sense resistor R has a first terminal that is coupled with a second terminal of the first transistor TS1, and a second terminal that is coupled with ground. In an embodiment, the first and second terminals of the first transistor TS1 are drain and source terminals, respectively. The output capacitor C has a first terminal that is coupled with the first terminal of the inductor L. The output capacitor C further has a second terminal that is coupled with the functional circuitry, and is configured to generate and provide the output voltage Vo to the functional circuitry. The second transistor TS2 has a first terminal that is coupled with the second terminal of the output capacitor C, and a second terminal that is coupled with the first terminal of the first, transistor TS1. In an embodiment, the first and second terminals of the second transistor TS2 are source and drain terminals, respectively. Further, gate terminals of the first and second transistors TS1 and TS2 are coupled with the gate driver 106. In an embodiment, the first transistor TS1 is an n-channel metal oxide semiconductor (NMOS) transistor, and the second transistor TS2 is a p-channel metal oxide semiconductor (PMOS) transistor.

The gate driver 106 is coupled with the system 104, and is configured to receive the PWM signal PS. Based on the PWM signal PS, the gate driver 106 is further configured to generate first and second gate driver signals GD1 and GD2. Further, the gate driver 106 is coupled with the gate terminals of the first and second transistors TS1 and TS2, and is configured to provide the first and second gate driver signals GD1 and GD2 to the gate terminals of the first and second transistors TS1 and TS2 to control the first and second transistors TS1 and TS2, respectively. In an embodiment, the gate driver 106 includes multiple delay elements and amplifiers for generating the first and second gate driver signals GD1 and GD2.

The first and second gate driver signals GD1 and GD2 are generated such that the first and second transistors TS1 and TS2 are not activated simultaneously. In an embodiment, when the PWM signal PS is activated (i.e., is at a logic high state), the first and second gate driver signals GD1 and GD2 are activated (i.e., are at logic high states). As the first gate driver signal GD1 is activated, the first transistor TS1 is activated, and as the second gate driver signal GD2 is activated, the second transistor TS2 is deactivated. Further, when the PWM signal PS is deactivated (i.e., is at a logic low state), the first and second gate driver signals GD1 and GD2 are deactivated (i.e., are at logic low states). As the first gate driver signal GD1 is deactivated, the first transistor TS1 is deactivated, and as the second gate driver signal GD2 is deactivated, the second transistor TS2 is activated.

When the first transistor TS1 is activated, the inductor L is charged (i.e., magnetic charge is stored in the inductor L), thereby leading to an increase in the inductor current $i_L$. Further, when the second transistor TS2 is activated, the charge stored in the inductor L is discharged by way of the second transistor TS2, thereby charging the output capacitor C and in turn increasing the output voltage Vo. Thus, when the second transistor TS2 is activated, the inductor current $i_L$ decreases. In other words, the inductor current $i_L$ increases when the PWM signal PS is activated, and decreases when the PWM signal PS is deactivated. The inductor current $i_L$ of the boost converter 102 is thus controlled by way of the PWM signal PS.

It will be apparent to a person skilled in the art that the scope of the present disclosure is not limited to the boost converter 102 as illustrated in the FIG. 1. In various other embodiments, boost converters with structures different than that of the boost converter 102 may be utilized, without deviating from the scope of the present disclosure.

The system 104 includes first through third comparators COM1-COM3, a ramp generator 108, a subtractor 110, a voltage divider 112, a compensator 114, a first latch L1, an inverter IV, a switch SW, a start-up controller 116, an analog-to-digital converter (ADC) 118, a look-up-table (LUT) 120, a pulse generator 122, a first multiplexer (MUX) M1, and a PWM circuit 124. In an embodiment, the first through third comparators COM1-COM3 are analog comparators.

The first comparator COM1 is coupled with the boost converter 102 (i.e., the first terminal of the sense resistor R), and is configured to receive a sense signal SS. The sense signal SS is indicative of a voltage drop across the sense resistor R when the inductor current $i_L$ passes through the sense resistor R. The sense signal SS is thus a voltage that is derived from the inductor current $i_L$. The first comparator COM1 is further configured to receive a first reference signal REF1. The first reference signal REF1 is generated by a first reference signal generator (not shown), and is a voltage that is derived from a reference current (shown in FIG. 4). The reference current corresponds to a peak value of the inductor current $i_L$ during a start-up of the boost converter 102. Additionally, the reference current is independent of the input voltage Vi (i.e., remains constant for various values of the input voltage Vi).

The first comparator COM1 is further coupled with the first MUX M1, and is further configured to receive a first MUX output signal MOS1 that controls an operation of the first comparator COM1. In an embodiment, when the first MUX output signal MOS1 is deactivated (i.e., is at a logic low state), the first comparator COM1 is activated (i.e., the first comparator COM1 is operational). Further, when the first MUX output signal MOS1 is activated (i.e., is at a logic high state), the first comparator COM1 is deactivated (i.e., the first comparator COM1 is non-operational).

When the first comparator COM1 is operational, the first comparator COM1 is further configured to compare the sense signal SS and the first reference signal REF1 to generate a first comparison signal CP1. In other words, the first comparison signal CP1 is generated based on a comparison of the inductor current $i_L$ and the reference current. In an embodiment, the first comparison signal CP1 is activated (i.e., is at a logic high state) when a voltage level of the sense signal SS is greater than or equal to a voltage level of the first reference signal REF1. Further, the first comparison signal CP1 is deactivated (i.e., is at a logic low state) when the voltage level of the sense signal SS is less than the voltage level of the first reference signal REF1.

The ramp generator 108 is coupled with the boost converter 102 (i.e., the first terminal of the sense resistor R), and is configured to receive the sense signal SS. The ramp generator 108 is further configured to generate a ramp signal RS by increasing a slope of the sense signal SS. The ramp signal RS is thus derived from the sense signal SS and corresponds to a slope compensation signal that prevents sub-harmonic oscillations in the output voltage Vo and improves a stability of the boost converter 102. Further, a voltage level of the ramp signal RS is greater than the voltage level of the sense signal SS.

The subtractor 110 is coupled with the voltage generator and the boost converter 102 (i.e., the second terminal of the output capacitor C), and is configured to receive the input voltage Vi and the output voltage Vo that are associated with the boost converter 102. Based on the input and output voltages Vi and Vo, the subtractor 110 is further configured to generate a subtractor output signal SOS. The subtractor output signal SOS is generated such that a voltage level of the subtractor output signal SOS is equal to a difference between the output voltage Vo and the input voltage Vi.

The voltage divider 112 is coupled with the subtractor 110, and is configured to receive the subtractor output signal SOS, and generate a voltage divided signal VDS. The voltage divided signal VDS is generated such that a voltage level of the voltage divided signal VDS is less than the voltage level of the subtractor output signal SOS. In an example, the voltage level of the voltage divided signal VDS is five times less than the voltage level of the subtractor output signal SOS.

The compensator 114 is coupled with the voltage divider 112, and is configured to receive the voltage divided signal VDS and a second reference signal REF2. The second reference signal REF2 is generated by a second reference signal generator (not shown). A voltage level of the second reference signal REF2 is determined based on a difference between the input voltage Vi and the steady-state output voltage Vo (i.e., the output voltage Vo during a steady-state operation of the boost converter 102). Based on a difference between the voltage levels of the voltage divided signal VDS and the second reference signal REF2, the compensator 114 is further configured to generate a compensation signal CMS. The compensation signal CMS is thus derived from the input and output voltages Vi and Vo. Further, a voltage level of the compensation signal CMS is greater than the difference between the voltage levels of the voltage divided signal VDS and the second reference signal REF2. In an embodiment, the compensator 114 is a type-II compensator.

The second comparator COM2 is coupled with the ramp generator 108 and the compensator 114, and is configured to receive the ramp signal RS and the compensation signal CMS. Further, the second comparator COM2 is coupled with the first MUX M1, and is configured to receive the first MUX output signal MOS1 that controls an operation of the second comparator COM2. In an embodiment, when the first MUX output signal MOS1 is deactivated, the second comparator COM2 is activated (i.e., the second comparator COM2 is operational), and when the first MUX output signal MOS1 is activated, the second comparator COM2 is deactivated (i.e., the second comparator COM2 is non-operational).

When the second comparator COM2 is operational, the second comparator COM2 is further configured to compare the ramp signal RS and the compensation signal CMS to generate a second comparison signal CP2. The second comparison signal CP2 is thus generated based on the inductor current $i_L$ and the input and output voltages Vi and Vo that are associated with the boost converter 102. In an embodiment, the second comparison signal CP2 is activated (i.e., is at a logic high state) when the voltage level of the ramp signal RS is greater than or equal to the voltage level of the compensation signal CMS. Further, the second comparison signal CP2 is deactivated (i.e., is at a logic low state) when the voltage level of the ramp signal RS is less than the voltage level of the compensation signal CMS.

The third comparator COM3 is coupled with the voltage divider 112, and is configured to receive the voltage divided signal VDS and a third reference signal REF3. The third reference signal REF3 is generated by a third reference signal generator (not shown), and has a voltage level that is marginally greater than the voltage level of the second reference signal REF2. In an example, a difference between the voltage levels of the second and third reference signals REF2 and REF3 is 0.01 V. The third comparator COM3 is further configured to compare the third reference signal REF3 and the voltage divided signal VDS to generate a third comparison signal CP3. In an embodiment, the third comparison signal CP3 is deactivated (i.e., is at a logic low state) when the voltage level of the voltage divided signal VDS is less than the voltage level of the third reference signal REF3. Further, the third comparison signal CP3 is activated (i.e., is at a logic high state) when the voltage level of the voltage divided signal VDS is equal to or greater than the voltage level of the third reference signal REF3.

The first latch L1 has a first input terminal that is coupled with ground, and a second input terminal that is coupled with the third comparator COM3. The second input terminal of the first latch L1 is configured to receive the third comparison signal CP3. The first latch L1 further has an output terminal that is configured to generate a first latch signal LAS1. In an embodiment, the first latch L1 is a set/reset (SR) latch, and the first and second input terminals of the first latch L1 are reset and set terminals, respectively. Thus, when the third comparison signal CP3 is activated, the first latch L1 is set and the first latch signal LAS1 is activated (i.e., is at a logic high state). Further, when the third comparison signal CP3 is deactivated, the first latch L1 is latched and the first latch signal LAS1 retains a previous logic state (i.e., remains in an activated state) as the first input terminal (i.e., the reset terminal) is coupled with ground. The first latch signal LAS1 is indicative of a completion of the start-up of the boost converter 102. In an embodiment, the first latch signal LAS1 is deactivated (i.e., is at a logic low state) during the start-up, and is activated (i.e., is at a logic high state) after the completion of the start-up.

The inverter IV has an input terminal that is coupled with the output terminal of the first latch L1, and is configured to receive the first latch signal LAS1. The inverter IV further has an output terminal that is configured to generate an inverted version of the first latch signal ILAS1 (hereinafter referred to as an "inverted first latch signal ILAS1"). In an embodiment, the inverter IV is a NOT gate.

The switch SW has a first terminal that is coupled with the second comparator COM2 and the compensator 114, and is configured to receive the compensation signal CMS. The switch SW further has a second terminal that is coupled with ground, and a control terminal that is coupled with the output terminal of the inverter IV. The control terminal of the switch SW is configured to receive the inverted first latch signal ILAS1 that controls an activation and a deactivation of the switch SW. In an embodiment, the switch SW is activated (i.e., closed) when the inverted first latch signal ILAS1 is activated (i.e., the first latch signal LAS1 is deactivated). Further, the switch SW is deactivated (i.e., open) when the inverted first latch signal ILAS1 is deactivated (i.e., the first latch signal LAS1 is activated). When the switch SW is activated, the compensation signal CMS is pulled to ground.

The start-up controller 116 is configured to receive first and second clock signals CLK1 and CLK2, and generate a first control signal CS1 such that an on-time duration of the first control signal CS1 is fixed and an off-time duration of the first control signal CS1 is dynamic. The first and second clock signals CLK1 and CLK2 are generated by first and second clock generators (not shown), respectively. The first and second clock generators may be internal or external to the start-up controller 116. Additionally, the first and second clock signals CLK1 and CLK2 are generated such that a frequency of the second clock signal CLK2 is less than a frequency of the first clock signal CLK1. In an example, the frequencies of the first and second clock signals CLK1 and CLK2 are 200 mega-hertz (MHz) and 3 MHz, respectively. The start-up controller 116 is explained in detail in conjunction with FIGS. 2 and 3.

The ADC 118 is coupled with the voltage generator, and is configured to receive the input voltage Vi, and generate an ADC output signal AOS by converting the input voltage Vi from an analog format to a digital format. The ADC output signal AOS is thus a digital representation of the input voltage Vi. Examples of the ADC 118 include, but are not limited to, a flash ADC, a successive approximation register ADC, a sub ranging ADC, a pipeline ADC, and a sigma-delta ADC.

The LUT 120 is coupled with the ADC 118, and is configured to receive the ADC output signal AOS, and output a LUT output signal LOS. In embodiment, the LUT output signal LOS is a numeric value that is associated with the digital representation of the input voltage Vi (i.e., the ADC output signal AOS). The LUT 120, in combination with the ADC 118, facilitates an operability of the boost converter 102 over a predefined range of voltages (i.e., over various values of the input voltage Vi). In an example, the predefined range of voltages corresponds to a range of voltages between 4.5 V to 52.5 V. Thus, the input voltage Vi may range from 4.5 V to 52.5 V.

The pulse generator 122 is coupled with the LUT 120, and is configured to receive the LUT output signal LOS. The pulse generator 122 is further coupled with the first and second clock generators, and is further configured to receive the first and second clock signals CLK1 and CLK2. Based on the LUT output signal LOS and the first and second clock signals CLK1 and CLK2, the pulse generator 122 is further configured to generate a second control signal CS2. In an embodiment, the second control signal CS2 is generated such that a frequency of the second control signal CS2 is equal to the frequency of the second clock signal CLK2, and a duty cycle of the second control signal CS2 is fixed. Thus, the second control signal CS2 is activated (i.e., is at a logic high state) for a first fixed time duration, and is deactivated (i.e., is at a logic low state) for a second fixed time duration that is different than the first fixed time duration. In other words, the second control signal CS2 has a fixed on-time duration and a fixed off-time duration.

The duty cycle of the second control signal CS2 (i.e., the fixed on-time duration and the fixed off-time duration of the second control signal CS2) is determined based on the LUT output signal LOS and the first and second clock signals CLK1 and CLK2. For example, the fixed on-time duration of the second control signal CS2 is equal to a product of the numeric value associated with the LUT output signal LOS and a time period of the first clock signal CLK1. Thus, if the numeric value associated with the LUT output signal LOS is '8', and the time period of the first clock signal CLK1 is 5 nanoseconds (ns), the fixed on-time duration of the second control signal CS2 is '8'*'5 ns' (i.e., '40 ns'). As the frequency of the second control signal CS2 is 3 MHz, the duty cycle of the second control signal CS2 is '40 ns'*'3 MHz' (i.e., 12%). Further, the duty cycle of the second control signal CS2 is marginally less than a steady-state duty cycle of the PWM signal PS. The steady-state duty cycle of the PWM signal PS corresponds to a duty cycle of the PWM signal PS during the steady-state operation of the boost converter 102.

The first MUX M1 has first and second input terminals that are coupled with the start-up controller 116 and the pulse generator 122, and are configured to receive the first and second control signals CS1 and CS2, respectively. The first MUX M1 further includes a select terminal that is coupled with the output terminal of the first latch L1, and is configured to receive the first latch signal LAS1. Further, the first MUX M1 has an output terminal that is configured to output, based on the first latch signal LAS1, one of the first and second control signals CS1 and CS2 as the first MUX output signal MOS1. In an embodiment, when the first latch signal LAS1 is deactivated, the first MUX M1 outputs the first control signal CS1 as the first MUX output signal MOS1. Further, when the first latch signal LAS1 is activated, the first MUX M1 outputs the second control signal CS2 as the first MUX output signal MOS1.

The output terminal of the first MUX M1 is coupled with the first and second comparators COM1 and COM2, and is configured to provide the first MUX output signal MOS1 to the first and second comparators COM1 and COM2 to control the operations of the first and second comparators COM1 and COM2, respectively. The first and second comparators COM1 and COM2 are controlled by the first MUX output signal MOS1 such that the first and second comparators COM1 and COM2 are operational and non-operational when the first MUX output signal MOS1 is deactivated and activated, respectively. The first MUX output signal MOS1 thus corresponds to a blanking signal that prevents erroneous activation of the first and second comparison signals CP1 and CP2.

The PWM circuit 124 is coupled with the first and second comparators COM1 and COM2, the output terminal of the first latch L1, the start-up controller 116, and the pulse generator 122, and is configured to receive the first and second comparison signals CP1 and CP2, the first latch signal LAS1, and the first and second control signals CS1 and CS2. Based on the first and second comparison signals CP1 and CP2, the first latch signal LAS1, and the first and second control signals CS1 and CS2, the PWM circuit 124 is further configured to generate the PWM signal PS. Further, the PWM circuit 124 is coupled with the boost converter 102 (i.e., the gate driver 106), and is configured to provide the PWM signal PS to the gate driver 106 to control the inductor current $i_L$ of the boost converter 102. The PWM circuit 124 includes second and third MUXs M2 and M3, a second latch L2, and a logic gate LG.

The second MUX M2 has first and second input terminals that are coupled with the first and second comparators COM1 and COM2, and are configured to receive the first and second comparison signals CP1 and CP2, respectively. The second MUX M2 further has a select terminal that is coupled with the output terminal of the first latch L1, and is configured to receive the first latch signal LAS1. Further, the second MUX M2 has an output terminal that is configured to output, based on the first latch signal LAS1, one of the first and second comparison signals CP1 and CP2 as a second MUX output signal MOS2. In an embodiment, when the first latch signal LAS1 is deactivated, the second MUX M2 outputs the first comparison signal CP1 as the second MUX output signal MOS2. Further, when the first latch signal LAS1 is activated, the second MUX M2 outputs the second comparison signal CP2 as the second MUX output signal MOS2.

The third MUX M3 has first and second input terminals that are coupled with the start-up controller 116 and the pulse generator 122, and are configured to receive the first and second control signals CS1 and CS2, respectively. The third MUX M3 further has a select terminal that is coupled with the output terminal of the first latch L1, and is configured to receive the first latch signal LAS1. Further, the third MUX M3 has an output terminal that is configured to output, based on the first latch signal LAS1, one of the first and second control signals CS1 and CS2 as a third MUX output signal MOS3. In an embodiment, when the first latch signal LAS1 is deactivated, the third MUX M3 outputs the first control signal CS1 as the third MUX output signal MOS3, and when the first latch signal LAS1 is activated, the third MUX M3 outputs the second control signal CS2 as the third MUX output signal MOS3.

The second latch L2 has first and second input terminals that are coupled with the output terminals of the second and third MUXs M2 and M3, and are configured to receive the second and third MUX output signals MOS2 and MOS3, respectively. The second latch L2 further has an output terminal that is configured to generate a second latch signal LAS2. In an embodiment, the second latch L2 is an SR latch, and the first and second input terminals of the second latch L2 are reset and set terminals, respectively. Thus, the second latch L2 is reset and the second latch signal LAS2 is deactivated (i.e., is at a logic low state) when the second MUX output signal MOS2 is activated (i.e., is at a logic high state). Similarly, when the third MUX output signal MOS3 is activated (i.e., is at a logic high state) and the second MUX output signal MOS2 is deactivated (i.e., is at a logic low state), the second latch L2 is set and the second latch signal LAS2 is activated (i.e., is at a logic high state). Further, when the second and third MUX output signals MOS2 and MOS3 are deactivated (i.e., are at logic low states), the second latch L2 is latched and the second latch signal LAS2 retains a previous logic state.

The logic gate LG has first and second input terminals that are coupled with the output terminals of the third MUX M3 and the second latch L2, and are configured to receive the third MUX output signal MOS3 and the second latch signal LAS2, respectively. The logic gate LG further has an output terminal that is coupled with the boost converter 102 (i.e. the gate driver 106), and is configured to generate and provide the PWM signal PS to the gate driver 106. In an embodiment, the PWM signal PS is activated when the second latch signal LAS2 or the third MUX output signal MOS3 is activated. Further, the PWM signal PS is deactivated when the second latch signal LAS2 and the third MUX output signal MOS3 are deactivated. In the presently preferred embodiment, the logic gate LG is an OR gate.

Figure 2:
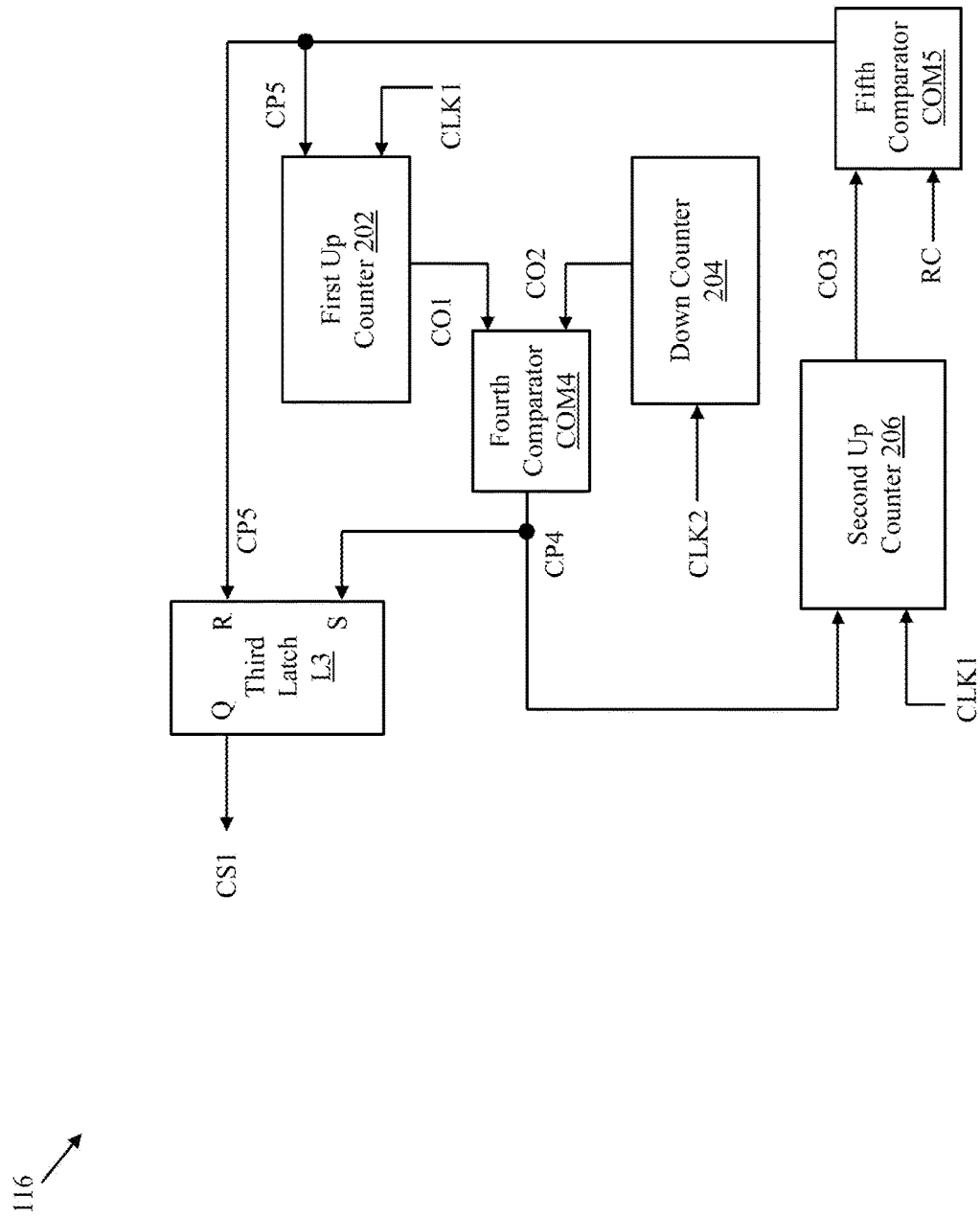
FIG. 2 illustrates a schematic block diagram of a start-up controller of the PCB of FIG. 1 in accordance with an embodiment of the present disclosure.

FIG. 2 illustrates a schematic block diagram of the start-up controller 116 in accordance with an embodiment of the present disclosure. The start-up controller 116 includes a first up counter 202, a down counter 204, a second up counter 206, fourth and fifth comparators COM4 and COM5, and a third latch L3. In an embodiment, the fourth and fifth comparators COM4 and COM5 are digital comparators, and the first and second up counters 202 and 206 and the down counter 204 are digital counters.

The first up counter 202 is coupled with the first clock generator, and is configured to receive the first clock signal CLK1, and generate a first count CO1. The first count CO1 is generated such that the first count CO1 is at a first predetermined value upon an activation of the first up counter 202 (i.e., upon a power-up of the PCB 100), and is subsequently incremented during each clock cycle of the first clock signal CLK1. In an embodiment, the first count CO1 is incremented during each positive clock edge of the first clock signal CLK1. In another embodiment, the first count CO1 is incremented during each negative clock edge of the first clock signal CLK1.

The down counter 204 is coupled with the second clock generator, and is configured to receive the second clock signal CLK2, and generate a second count CO2. The down counter 204 is preloaded with a second predetermined value. In other words, upon an activation of the down counter 204 (i.e., upon the power-up of the PCB 100), the second count CO2 is at the second predetermined value and is subsequently decremented during each clock cycle of the second clock signal CLK2. In an embodiment, the second count CO2 is decremented during each positive clock edge of the second clock signal CLK2. In another embodiment, the second count CO2 is decremented during each negative clock edge of the second clock signal CLK2.

The second predetermined value is determined based on the input voltage Vi. In an example, the second predetermined value is inversely proportional to the input voltage Vi. Thus, if a first value of the input voltage Vi is greater than a second value of the input voltage Vi, the second predetermined value associated with the first value of the input voltage Vi is less than the second predetermined value associated with the second value of the input voltage Vi.

The fourth comparator COM4 is coupled with the first up counter 202 and the down counter 204, and is configured to receive the first and second counts CO1 and CO2. The fourth comparator COM4 is further configured to compare the first and second counts CO1 and CO2 to generate a fourth comparison signal CP4. In an embodiment, the fourth comparison signal CP4 is deactivated (i.e., is at a logic low state) when the first count CO1 is less than the second count CO2. Further, the fourth comparison signal CP4 is activated (i.e., is at a logic high state) when the first count CO1 is greater than or equal to the second count CO2. Additionally, the fourth comparison signal CP4 is generated such that an on-time duration of the fourth comparison signal CP4 is fixed, and an off-time duration of the fourth comparison signal CP4 is dynamic.

The second up counter 206 is coupled with the first clock generator, and is configured to receive the first clock signal CLK1, and generate a third count CO3. The third count CO3 is at a third predetermined value upon an activation of the second up counter 206 (i.e., upon the power-up of the PCB 100), and is subsequently incremented during each clock cycle of the first clock signal CLK1. In an embodiment, the third count CO3 is incremented during each positive clock edge of the first clock signal CLK1. In another embodiment, the third count CO3 is incremented during each negative clock edge of the first clock signal CLK1. The second up counter 206 is further coupled with the fourth comparator COM4, and is further configured to receive the fourth comparison signal CP4. When the fourth comparison signal CP4 transitions from a deactivated state to an activated state, the third count CO3 is reset to the third predetermined value.

The fifth comparator COM5 is coupled with the second up counter 206, and is configured to receive the third count CO3 and a reference count RC. The fifth comparator COM5 is further configured to compare the third count CO3 and the reference count RC to generate a fifth comparison signal CP5. In an embodiment, the fifth comparison signal CP5 is deactivated (i.e., is at a logic low state) when the third count CO3 is less than the reference count RC. Further, the fifth comparison signal CP5 is activated (i.e., is at a logic high state) when the third count CO3 is greater than or equal to the reference count RC. Additionally, the fifth comparison signal CP5 is generated such that an on-time duration of the fifth comparison signal CP5 is dynamic, and the off-time duration of the fifth comparison signal CP5 is fixed. The reference count RC is generated by a reference counter (not shown). The reference count RC controls the fixed off-time duration of the fifth comparison signal CP5 and the fixed on-time duration of the fourth comparison signal CP4. In an example, the reference count RC is generated such that the fixed off-time duration of the fifth comparison signal CP5 and the fixed on-time duration of the fourth comparison signal CP4 is 20 ns. The fifth comparator COM5 is further coupled with the first up counter 202, and is configured to provide the fifth comparison signal CP5 to the first up counter 202. When the fifth comparison signal CP5 transitions from a deactivated state to an activated state, the first count CO1 is reset to the first predetermined value.

The third latch L3 has first and second input terminals that are coupled with the fifth and fourth comparators COM1 and COM4, and are configured to receive the fifth and fourth comparison signals CP5 and CP4, respectively. In an embodiment, the third latch L3 is an SR latch, and the first and second input terminals of the third latch L3 are reset and set terminals, respectively. The third latch L3 further has an output terminal that is configured to generate the first control signal CS1 such that the first control signal CS1 is activated (i.e., is at a logic high state) when the fourth comparison signal CP4 is activated, and deactivated (i.e., is at a logic low state) when the fifth comparison signal CP5 is activated. Thus, as the first control signal CS1 is activated when the fourth comparison signal CP4 is activated, the on-time duration of the first control signal CS1 is fixed as the on-time duration of the fourth comparison signal CP4 is fixed. Further, as the first control signal CS1 is deactivated when the fifth comparison signal CP5 is activated, the off-time duration of the first control signal CS1 is dynamic as the on-time duration of the fifth comparison signal CP5 is dynamic. Further, the output terminal of the third latch L3 is coupled with the first input terminals of the first and third MUXs M1 and M3, and is configured to provide the first control signal CS1 to the first input terminals of the first and third MUXs M1 and M3.

Figure 3:
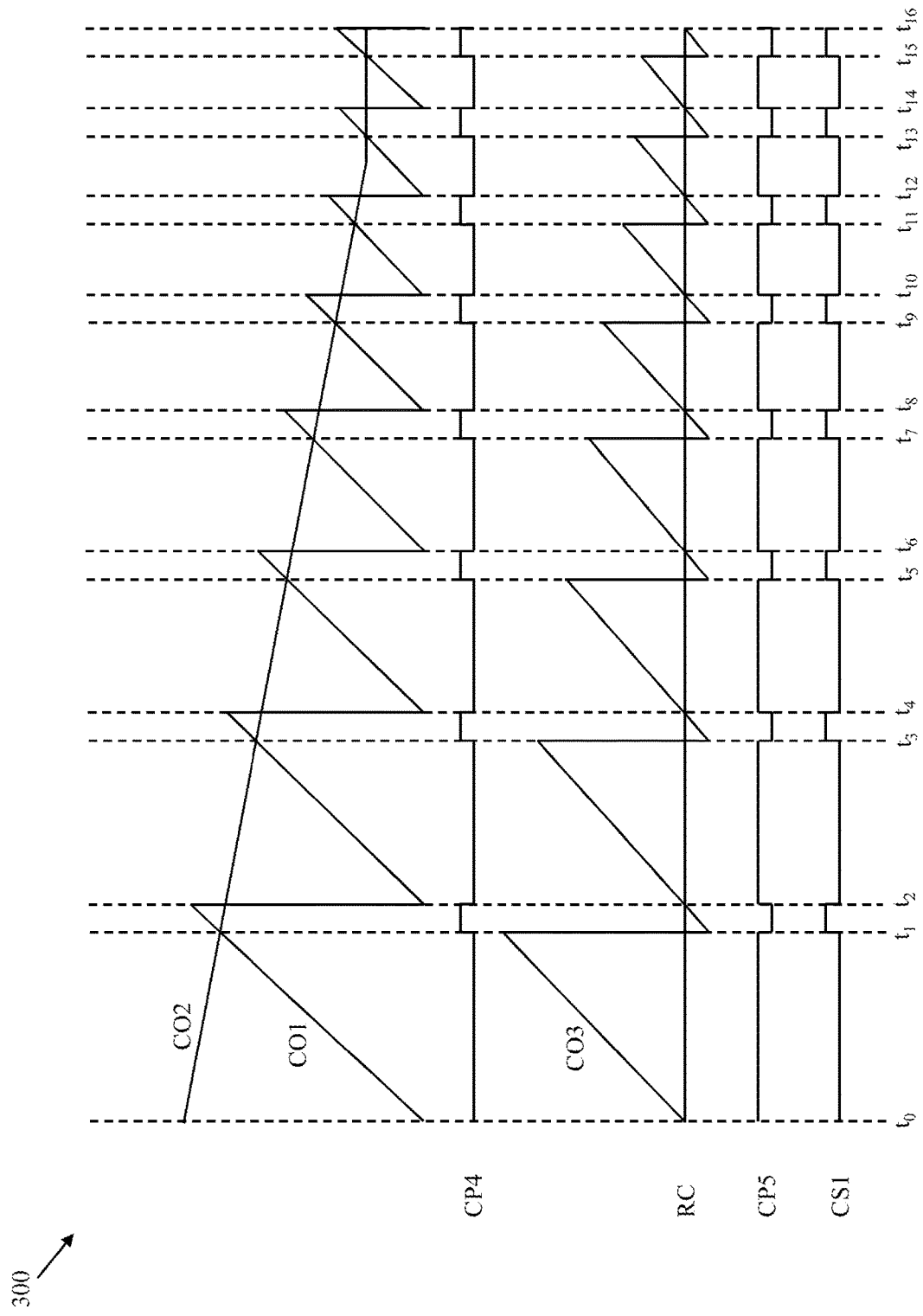
FIG. 3 is a timing diagram that illustrates an operation of the start-up controller in accordance with an embodiment of the present disclosure.

FIG. 3 is a timing diagram 300 that illustrates the operation of the start-up controller 116 in accordance with an embodiment of the present disclosure. During time period $t_0$-$t_1$, the first and third counts CO1 and CO3 are incremented during each clock cycle of the first clock signal CLK1, and the second count CO2 is decremented during each clock cycle of the second clock signal CLK2. For the sake of ongoing discussion, it is assumed that during time period $t_0$-$t_1$, the first count CO1 is less than the second count CO2, and the third count CO3 is greater than the reference count RC. Thus, the fourth and fifth comparison signals CP4 and CP5 are deactivated and activated, respectively, and hence, the first control signal CS1 is deactivated.

At time instance $t_1$, the first count CO1 is equal to the second count CO2. Thus, the fourth comparison signal CP4 transitions from a deactivated state to an activated state, and as a result, the third count CO3 transitions downwards and is reset to the third predetermined value. The third count CO3 is thus less than the reference count RC. Hence, the fifth comparison signal CP5 transitions from an activated state to a deactivated state. As the fourth comparison signal CP4 transitions from a deactivated state to an activated state and the fifth comparison signal CP5 transitions from an activated state to a deactivated state, the first control signal CS1 transitions from a deactivated state to an activated state.

During time period $t_1$-$t_2$, the first and third counts CO1 and CO3 are incremented in accordance with the first clock signal CLK1, and the second count CO2 is decremented in accordance with the second clock signal CLK2. Further, the fourth and fifth comparison signals CP4 and CP5 remain activated and deactivated, respectively, and hence, the first control signal CS1 remains activated.

At time instance $t_2$, the third count CO3 is equal to the reference count RC, and hence, the fifth comparison signal CP5 transitions from a deactivated state to an activated state. As a result, the first count CO1 transitions downwards and is reset to the first predetermined value. The first count CO1 is thus less than the second count CO2, and hence, the fourth comparison signal CP4 transitions from an activated state to a deactivated state. As the fifth comparison signal CP5 transitions from a deactivated state to an activated state and the fourth comparison signal CP4 transitions from an activated state to a deactivated state, the first control signal CS1 transitions from an activated state to a deactivated state.

During time period $t_2$-$t_3$, the first and third counts CO1 and CO3 are incremented in accordance with the first clock signal CLK1, and the second count CO2 is decremented in accordance with the second clock signal CLK2 until the first count CO1 is equal to the second count CO2 (i.e., at time instance $t_3$). Thus, it will be apparent to a person skilled in the art that during time periods $t_2$-$t_4$, $t_4$-$t_6$, $t_6$-$t_8$, $t_8$-$t_{10}$, $t_{10}$-$t_{12}$, $t_{12}$-$t_{14}$, $t_{14}$-$t_{16}$, the deactivation and activation of the first control signal CS1 is similar to the deactivation and activation of the first control signal CS1 during time period $t_0$-$t_2$ as described above. Additionally, as illustrated in FIG. 2, the second count CO2 is decremented gradually and continuously in the aforementioned time periods (i.e., is not reset). Thus, during time periods $t_2$-$t_4$, $t_4$-$t_6$, $t_6$-$t_8$, $t_8$-$t_{10}$, $t_{10}$-$t_{12}$, $t_{12}$-$t_{14}$, $t_{14}$-$t_{16}$, the on-time duration of the fourth comparison signal CP4 and the off-time duration of the fifth comparison signal CP5 remain constant. Further, the on-time duration of the fifth comparison signal CP5 and the off-time duration of the fourth comparison signal CP4 are dynamic and decrease with each time period.

As the first control signal CS1 is activated when the fourth comparison signal CP4 is activated, the on-time duration of the first control signal CS1 is fixed. Similarly, as the first control signal CS1 is deactivated when the fifth comparison signal CP5 is activated, the off-time duration of the first control signal CS1 is dynamic and decreases with each time period (i.e., with each successive cycle of the first control signal CS1). Thus, a duty cycle of the first control signal CS1 is dynamic and increases with each successive cycle during the start-up of the boost converter 102. Further, it will be apparent to a person skilled in the art that the first through third counts CO1-CO3 are illustrated in FIG. 2 as straight lines, and that the transitions of various signals illustrated in FIG. 2 are sans set up time associated with each signal to make the illustrations concise and clear and should not be considered as a limitation of the present disclosure.

In operation, when the PCB 100 is powered-up, the start-up of the boost converter 102 is initiated. During the start-up, the first latch signal LAS1 is deactivated. Hence, the switch SW is activated and the compensation signal CMS is pulled to ground. Further, the second and third MUXs M2 and M3 output the first comparison signal CP1 and the first control signal CS1 as the second and third MUX output signals MOS2 and MOS3, respectively. Similarly, the first MUX M1 outputs the first control signal CS1 as the first MUX output signal MOS1. Further, the first control signal CS1 is generated such that the on-time duration of the first control signal CS1 is fixed and the off-time duration of the first control signal CS1 is dynamic and decreases with each successive cycle of the first control signal CS1 during the start-up.

When the first control signal CS1 is activated, the first comparator COM1 is non-operational and the second latch L2 is set. As the second latch L2 is set, the second latch signal LAS2, and in turn, the PWM signal PS transition from a deactivated state to an activated state. As a result, the first transistor TS1 is activated, and the inductor L is charged. The charging of the inductor L results in an increase in the inductor current $i_L$, which in turn, leads to an increase in the voltage level of the sense signal SS. When the first control signal CS1 transitions from an activated state to a deactivated state, the first comparator COM1 is operational. For the sake of ongoing discussion, it is assumed that when the first control signal CS1 transitions from an activated state to a deactivated state, the voltage level of the sense signal SS is less than the voltage level of the first reference signal REF1. Thus, the first comparison signal CP1 is deactivated. Further, as the first control signal CS1 is deactivated, the second latch L2 is latched. As the second latch L2 is latched, the second latch signal LAS2, and in turn, the PWM signal PS remain activated, thereby leading to a further increase in the inductor current $i_L$.

When the voltage level of the sense signal SS is equal to the voltage level of the first reference signal REF1 (i.e., the inductor current $i_L$ is equal to the reference current), the first comparison signal CP1 is activated. As the first comparison signal CP1 is activated, the second latch L2 is reset, and as a result, the second latch signal LAS2, and in turn, the PWM signal PS transition from an activated state to a deactivated state. As the reference current is independent of the input voltage Vi, an on-time duration of the PWM signal PS during the start-up is inversely proportional to the input voltage Vi. Thus, if the first value of the input voltage Vi is greater than the second value of the input voltage Vi, the on-time duration of the PWM signal PS during the start-up when the boost converter 102 receives the first value of the input voltage Vi is less than that when the boost converter 102 receives the second value of the input voltage Vi.

As the PWM signal PS transitions from an activated state to a deactivated state, the first transistor TS1 is deactivated and the second transistor TS2 is activated. The inductor L thus discharges, by way of the second transistor TS2, and charges the output capacitor C. The discharging of the inductor L results in a decrease in the inductor current $i_L$. As the inductor current $i_L$ decreases, the voltage level of the sense signal SS decreases, and is less than the voltage level of the first reference signal REF1. Hence, the first comparison signal CP1 is deactivated. As the first control signal CS1 remains deactivated, the second latch L2 is latched. Hence, the second latch signal LAS2 and the PWM signal PS remain deactivated. The inductor L discharges until the PWM signal PS is activated (i.e., the first control signal CS1 is activated).

The dynamic off-time duration of the first control signal CS1 ensures that the inductor L is wholly discharged. As the inductor L is wholly discharged, a time taken for the inductor current $i_L$ to increase from a fully discharged state to be equal to the reference current is constant. Hence, the on-time duration of the PWM signal PS is fixed. Further, the off-time duration of the first control signal CS1 is dynamic and decreases with each successive cycle of the first control signal CS1. As the PWM signal PS transitions from a deactivated state to an activated state when the first control signal CS1 is activated, the off-time duration of the PWM signal PS is dynamic and decreases with successive cycle of the PWM signal PS. In other words, during the start-up, the inductor L is charged for a fixed time duration, and discharged for a dynamic time duration. Thus, during the start-up, a duty cycle of the PWM signal PS increases with each successive cycle of the PWM signal PS. Further, the peak value of the inductor current $i_L$ is constant during the start-up. As the peak value of the inductor current $i_L$ is constant and the inductor L is discharged wholly, an average value of the inductor current $i_L$ (shown in FIG. 5) is constant. The charging of the output capacitor C by the constant average value of the inductor current $i_L$ results in a linear increase in the output voltage Vo. Thus, the output voltage Vo increases during the start-up of the boost converter 102.

When the voltage level of the voltage divided signal VDS (that is derived from the output voltage Vo) is equal to the voltage level of the third reference signal REF3, the third comparison signal CP3 and the first latch signal LAS1 are activated. The activation of the first latch signal LAS1 indicates the completion of the start-up of the boost converter 102. In an embodiment, the start-up controller 116 is deactivated after the completion of the start-up. Further, the duty cycle of the PWM signal PS on the completion of the start-up is greater than the steady-state duty cycle of the PWM signal PS.

As the first latch signal LAS1 is activated, the switch SW is deactivated, and the second and third MUXs M2 and M3 output the second comparison signal CP2 and the second control signal CS2 as the second and third MUX output signals MOS2 and MOS3, respectively. Similarly, the first MUX M1 outputs the second control signal CS2 as the first MUX output signal MOS1.

The compensation signal CMS is clamped to ground (i.e., pulled to ground) during the start-up, and hence, the voltage level of the ramp signal RS is greater than the voltage level of the compensation signal CMS during the start-up. The second comparison signal CP2 is thus activated during the start-up. Upon the deactivation of the switch SW after the completion of the start-up, the voltage level of the compensation signal CMS increases. However, the voltage level of the ramp signal RS remains greater than the voltage level of the compensation signal CMS, and hence, the second comparison signal CP2 remains activated after the completion of the start-up. As a result, the second latch L2 is reset, and the second latch signal LAS2 is deactivated. Thus, after the completion of the start-up and prior to the steady-state operation of the boost converter 102, the second control signal CS2 is outputted as the PWM signal PS. In other words, after the completion of the start-up and prior to the steady-state operation of the boost converter 102, the PWM signal PS is activated and deactivated when the second control signal CS2 is activated and deactivated, respectively.

The duty cycle of the second control signal CS2 is less than the duty cycle of the PWM signal PS when the start-up is completed. Hence, the inductor current $i_L$ decreases, which in turn leads to a decrease in the output voltage Vo. As a result, the voltage level of the voltage divided signal VDS decreases. The voltage level of the voltage divided signal VDS is thus less than the voltage level of the third reference signal REF3, and consequently, the third comparison signal CP3 is deactivated. The first latch L1 is thus latched, and the first latch signal LAS1 remains activated.

When the voltage level of the voltage divided signal VDS is equal to the voltage level of the second reference signal REF2, the steady-state operation of the boost converter 102 is initiated. In other words, the handover from the start-up to the steady-state operation is complete. As the difference between the voltage levels of the second and third reference signals REF2 and REF3 is marginal, and as the compensation signal CMS is clamped to ground during the start-up, a time duration between the completion of the start-up and the initiation of the steady-state operation is controlled and maintained such that slewing of the compensation signal CMS is minimized.

When the steady-state operation of the boost converter 102 is initiated, the compensation signal CMS is at a voltage level that is greater than the voltage level of the ramp signal RS. The second comparison signal CP2 is thus deactivated. As the second comparison signal CP2 is deactivated, the second latch L2 is set when the second control signal CS2 is activated. Thus, during the steady-state operation of the boost converter 102, the PWM signal PS transitions from a deactivated state to an activated state when the second control signal CS2 is activated. When the second control signal CS2 and the second comparison signal CP2 are deactivated, the second latch L2 is latched. Hence, the PWM signal PS remains activated. Thus, the duty cycle of the PWM signal PS during the steady-state operation of the boost converter 102 is greater than the duty cycle of the PWM signal PS prior to the steady-state operation and after the completion of the start-up. As a result, the inductor current $i_L$ and the output voltage Vo increases. As the inductor current $i_L$ increases, the voltage level of the sense signal SS increases, which in turn increases the voltage level of the ramp signal RS.

When the voltage level of the ramp signal RS is equal to the voltage level of the compensation signal CMS, the second comparison signal CP2 is activated. The second latch L2 is thus reset, leading to the deactivation of the PWM signal PS. Thus, during the steady-state operation, the PWM signal PS transitions from an activated state to a deactivated state when the second comparison signal CP2 is activated. The PWM signal PS subsequently transitions from a deactivated state to an activated state when the second control signal CS2 is activated. Further, the steady-state duty cycle of the PWM signal PS ensures that the output voltage Vo remains constant during the steady-state operation of the boost converter 102.

Figure 4:
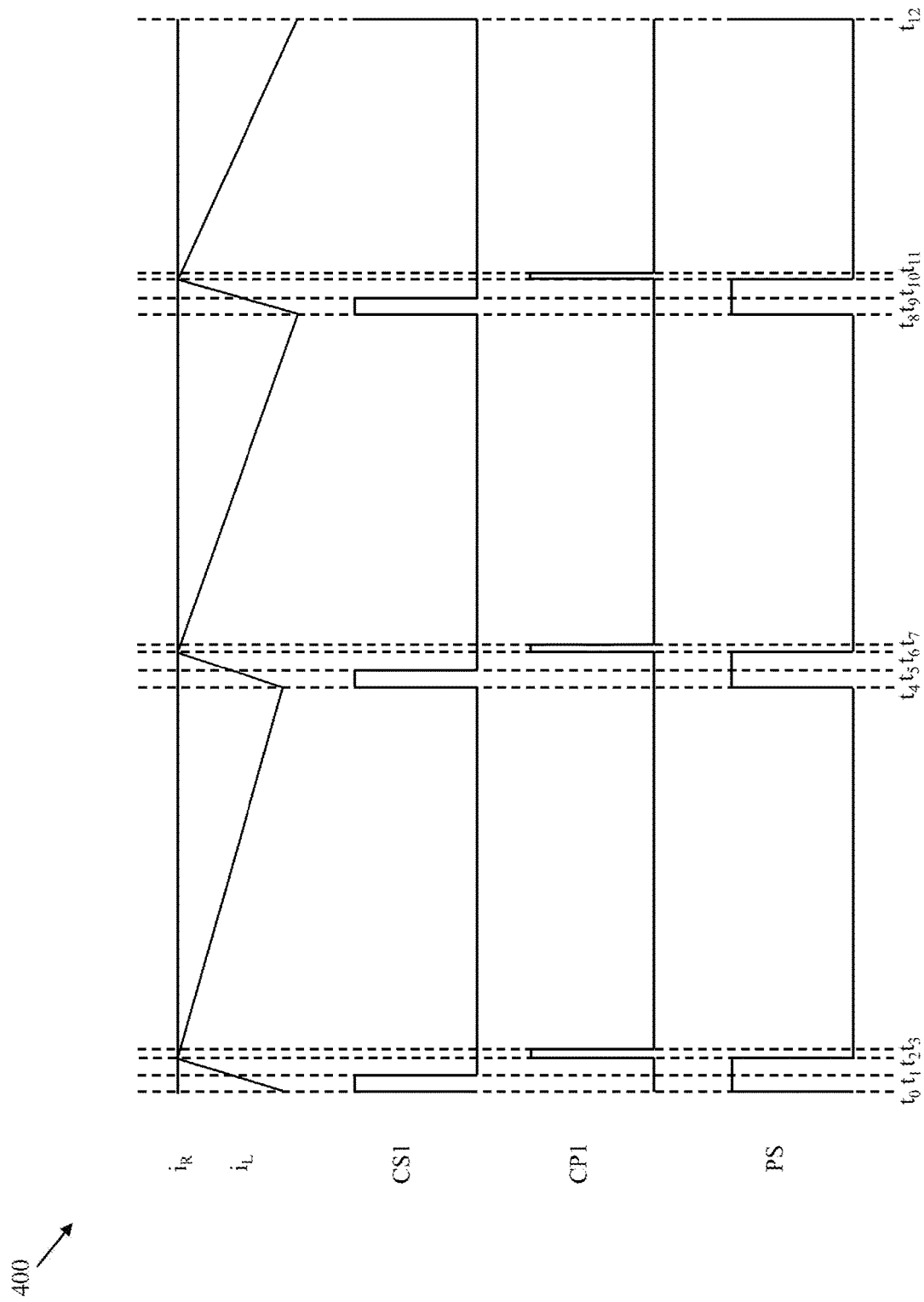
FIG. 4 is a timing diagram that illustrates an operation of a pulse width modulation (PWM) circuit of the PCB of FIG. 1 during a start-up of a boost converter of the PCB of FIG. 1 in accordance with an embodiment of the present disclosure.

FIG. 4 is a timing diagram 400 that illustrates an operation of the PWM circuit 124 during the start-up of the boost converter 102 in accordance with an embodiment of the present disclosure. At time instance $t_0$, the first control signal CS1 transitions from a deactivated state to an activated state. Hence, the second latch L2 is set, and the PWM signal PS transitions from a deactivated state to an activated state. For the sake of ongoing discussion, it is assumed that the first comparison signal CP1 is deactivated at time instance $t_0$. During time period $t_0$-$t_1$, the first control signal CS1 remains activated and the first comparison signal CP1 remains deactivated. Hence, the PWM signal PS remains activated, and the inductor L charges. As a result, the inductor current $i_L$ increases.

At time instance $t_1$, the first control signal CS1 transitions from an activated state to a deactivated state, whereas the first comparison signal CP1 remains deactivated. Hence, the second latch L2 is latched and the PWM signal PS remains in an activated state. During time period $t_1$-$t_2$, the first control signal CS1 and the first comparison signal CP1 remain deactivated, and the PWM signal PS remains activated. The inductor current $i_L$ thus further increases.

At time instance $t_2$, the inductor current $i_L$ is equal to the reference current (hereinafter referred to and designated as the "reference current $i_R$"). In other words, the voltage level of the sense signal SS is equal to the voltage level of the first reference signal REF1. Hence, the first comparison signal CP1 transitions from a deactivated state to an activated state and resets the second latch L2. Further, the PWM signal PS transitions from an activated state to a deactivated state. The first control signal CS1 remains deactivated at time instance $t_2$. During time period $t_2$-$t_3$, the first comparison signal CP1 remains activated, and the first control signal CS1 and the PWM signal PS remain deactivated. As the PWM signal PS remains deactivated, the inductor L discharges the charge stored therein, and hence, the inductor current $i_L$ decreases.

At time instance $t_3$, the first comparison signal CP1 transitions from an activated state to a deactivated state (as the inductor current $i_L$ is less than the reference current $i_R$). Further, the first control signal CS1 remains deactivated. The second latch L2 is thus latched, and the PWM signal PS retains a previous logic state, i.e., remains deactivated. Hence, the inductor current $i_L$ further decreases. During time period $t_3$-$t_4$, the first control signal CS1, the first comparison signal CP1, and the PWM signal PS remain deactivated. The inductor L thus continues to discharge the charge stored therein, and the inductor current $i_L$ further decreases. The inductor current $i_L$ continues to decrease until the first control signal CS1, and in turn, the PWM signal PS transition from a deactivated state to an activated state at time instance $t_4$.

It will be apparent to a person skilled in the art that the activation and deactivation of the PWM signal PS during time periods $t_4$-$t_8$ and $t_8$-$t_{12}$ is the same as the activation and deactivation of the PWM signal PS during time period $t_0$-$t_4$ as described above. As illustrated in FIG. 4, the off-time duration of the first control signal CS1 is dynamic and decreases with each successive cycle of the first control signal CS1. Hence, the off-time duration of the PWM signal PS during the start-up is dynamic and decreases with each successive cycle of the PWM signal PS. As a result, the duty cycle of the PWM signal PS during the start-up of the boost converter 102 increases with each successive cycle of the PWM signal PS. Further, it will be apparent to a person skilled in the art that the transitions of various signals illustrated in FIG. 4 are sans set up time associated with each signal to make the illustrations concise and clear and should not be considered as a limitation of the present disclosure.

Figure 5:
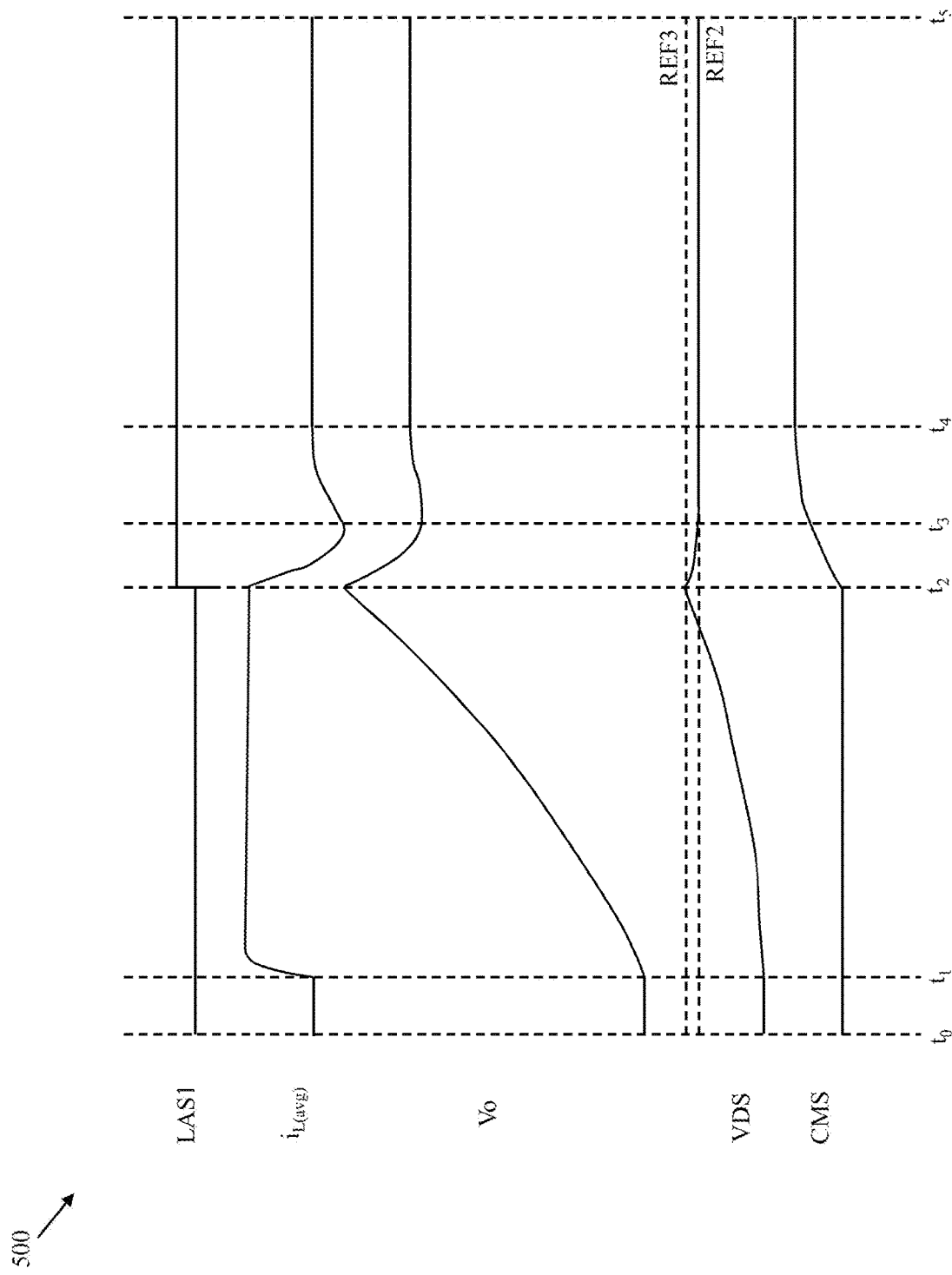
FIG. 5 is a timing diagram that illustrates the operation of the boost converter in accordance with an embodiment of the present disclosure.

FIG. 5 is a timing diagram 500 that illustrates an operation of the boost converter 102 in accordance with an embodiment of the present disclosure. During time period $t_0$-$t_1$, the boost converter 102 is powered off. Hence, the first latch signal LAS1 is deactivated. Further, the average value of the inductor current $i_L$ (hereinafter referred to and designated as an "average inductor current $i_{L(avg)}$") is at a fourth predetermined value. Similarly, the output voltage Vo and the voltage levels of the voltage divided signal VDS and the compensation signal CMS are at a fifth predetermined value. In an example, the fourth and fifth predetermined values correspond to 0 milliamperes (mA) and 0 V, respectively.

At time instance $t_1$, the boost converter 102 is powered on. During time period $t_1$-$t_2$, the first latch signal LAS1 remains deactivated. Further, the average inductor current $i_{L(avg)}$ increases and remains constant at a sixth predetermined value, which in turn results in a linear increase in the output voltage Vo. As the voltage divided signal VDS is derived from the difference in the input voltage Vi and the output voltage Vo, an increase in the output voltage Vo results in an increase in the voltage level of the voltage divided signal VDS. Further, as the first latch signal LAS1 is deactivated, the switch SW is activated. Hence, the compensation signal CMS is pulled to ground (i.e., the voltage level of the compensation signal CMS remains at the fifth predetermined value).

At time instance $t_2$, the voltage level of the voltage divided signal VDS is equal to the voltage level of the third reference signal REF3. Hence, the third comparison signal CP3 is activated, and the first latch signal LAS1 transitions from a deactivated state to an activated state, thereby indicating the completion of the start-up of the boost converter 102. Time period $t_1$-$t_2$ thus corresponds to the start-up of the boost converter 102. Further, as the first latch signal LAS1 transitions from a deactivated state to an activated state, the switch SW is deactivated.

During time period $t_2$-$t_3$, i.e., after the completion of the start-up and prior to the steady-state operation of the boost converter 102, the PWM signal PS is activated and deactivated when the second control signal CS2 is activated and deactivated, respectively. As the duty cycle of the second control signal CS2 is less than the duty cycle of the PWM signal PS when the start-up is completed, the average inductor current $i_{L(avg)}$ decreases and falls below the fourth predetermined value (i.e., the inductor current $i_L$ flows from the output capacitor C to the inductor L, thereby discharging the output capacitor C). Hence, the output voltage Vo and the voltage level of the voltage divided signal VDS decrease. Further, as the switch SW is deactivated at time instance $t_2$, the voltage level of the compensation signal CMS increases during time period $t_2$-$t_3$.

At time instance $t_3$, the voltage level of the voltage divided signal VDS is equal to the voltage level of the second reference signal REF2. As a result, the voltage level of the compensation signal CMS is greater than the voltage level of the ramp signal RS, and hence, the second comparison signal CP2 is deactivated. The time instance $t_3$ is indicative of the start of the steady-state operation of the boost converter 102. Thus, time period $t_2$-$t_3$ corresponds to a handover from the start-up to the steady-state operation of the boost converter 102.

During time period $t_3$-$t_4$, the PWM signal PS transitions from a deactivated state to an activated state when the second control signal CS2 is activated, and from an activated state to a deactivated state when the second comparison signal CP2 is activated. The steady-state duty cycle of the PWM signal PS is marginally greater than the duty cycle of the PWM signal PS prior to the steady-state operation and after the completion of the start-up (i.e., during time period $t_2$-$t_3$). Hence, the average inductor current $i_{L(avg)}$ and the output voltage Vo increases. The voltage level of the voltage divided signal VDS remains unchanged (i.e., remains equal to the voltage level of the second reference signal REF2) as the change in the output voltage Vo is marginal and does not result in a change in the voltage level of the voltage divided signal VDS. The voltage level of the compensation signal CMS further increases during time period $t_3$-$t_4$ as a result of compensation capacitances (not shown) of the compensator 114.

At time instance $t_4$, the average inductor current $i_{L(avg)}$ is equal to a steady-state average inductor current $i_{L(avg)}$ (i.e., the average inductor current $i_{L(avg)}$ during the steady state operation of the boost converter 102). For the sake of ongoing discussion, it is assumed that the boost converter 102 operates sans a load. Hence, the steady-state average inductor current $i_{L(avg)}$ is equal to the fourth predetermined value (i.e., 0 mA). Further, the output voltage Vo is equal to the steady-state output voltage Vo. Similarly, the voltage level of the compensation signal CMS is equal to a steady-state voltage level of the compensation signal CMS. Further, the voltage level of the voltage divided signal VDS remains constant and equal to the voltage level of the second reference signal REF2.

During time period $t_4$-$t_5$, the average inductor current $i_{L(avg)}$ remains constant at the steady-state average inductor current $i_{L(avg)}$, and the output voltage Vo remains constant at the steady-state output voltage Vo. Further, the voltage level of the voltage divided signal VDS remains constant and equal to the voltage level of the second reference signal REF2, and the voltage level of the compensation signal CMS remains constant at the steady-state voltage level of the compensation signal CMS. The first latch signal LAS1 remains activated during time period $t_2$-$t_5$. Further, it will be apparent to a person skilled in the art that the transitions of various signals illustrated in FIG. 5 are sans set up time associated with each signal to make the illustrations concise and clear and should not be considered as a limitation of the present disclosure.

Although the present disclosure describes that the boost converter 102 operates sans the load, the scope of the present disclosure is not limited to it. In various other embodiments, the boost converter 102 may include a load to regulate the output voltage Vo, without deviating from the scope of the present disclosure. In such a scenario, the steady-state average inductor current $i_{L(avg)}$ is greater than the fourth predetermined value.

Thus, the system 104 maintains the constant peak value of the inductor current $i_L$ during the start-up of the boost converter 102. The peak value of the inductor current $i_L$ during the start-up of the boost converter 102 is significantly less than an inrush current of a conventional boost converter (i.e., a boost converter that is not controlled by the system 104 of the present disclosure). Hence, the saturation current of the inductor L that is utilized in the boost converter 102 is significantly less than that of an inductor utilized in the conventional boost converter. As a result, a size, and in turn, a manufacturing cost of the inductor L are significantly less than that of the inductor utilized in the conventional boost converter. The reduction in the size and the manufacturing cost of the inductor L results in a significant reduction in sizes and manufacturing costs of the boost converter 102 and the PCB 100. Thus, the sizes and the manufacturing costs of the boost converter 102 and the PCB 100 are significantly less than that of the conventional boost converter and a PCB that includes the conventional boost converter, respectively.

The peak value of the inductor current $i_L$ being significantly less than the inrush current of the conventional boost converter facilitates optimization of the design of integrated switches and metallization that are utilized in the boost converter 102. For example, widths of metal contacts associated with the metallization and sizes of the integrated switches in the boost converter 102 are significantly less than that in the conventional boost converter, respectively. The optimization of the design of integrated switches and metallization leads to a further decrease in the size and the manufacturing cost of the boost converter 102. Additionally, as the system 104 controls the inductor current $i_L$ of the boost converter 102 sans an off-chip capacitor, a size and a manufacturing cost of the system 104 are significantly less than that of a conventional system that utilizes an off-chip capacitor for controlling the inrush current of a corresponding boost converter. Thus, the size and the manufacturing cost of the PCB 100 that includes the boost converter 102 and the system 104 of the present disclosure are significantly less than that of a PCB that includes the conventional system and the corresponding boost converter.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A system for controlling an inductor current of a boost converter, the system comprising:
   a start-up controller that is configured to generate a first control signal such that an on-time duration of the first control signal is fixed and an off-time duration of the first control signal is dynamic; and
   a pulse width modulation (PWM) circuit that is coupled with the start-up controller and the boost converter, wherein the PWM circuit is configured to: (i) receive the first control signal, and a first comparison signal that is generated based on a comparison of the inductor current and a reference current, and (ii) generate and provide a PWM signal to the boost converter to control the inductor current of the boost converter, and wherein during a start-up of the boost converter, the PWM signal transitions from a deactivated state to an activated state when the first control signal is activated, and from the activated state to the deactivated state when the first comparison signal is activated.

2. The system of claim 1, wherein the PWM circuit is further configured to receive: (i) a second control signal having a fixed on-time duration and a fixed off-time duration, (ii) a second comparison signal that is generated based on the inductor current and input and output voltages associated with the boost converter, and (iii) a first latch signal that is indicative of a completion of the start-up, wherein the first latch signal is deactivated during the start-up, and activated after the completion of the start-up, and wherein the PWM signal is further generated based on the second control signal, the second comparison signal, and the first latch signal.

3. The system of claim 2, wherein after the completion of the start-up and prior to a steady-state operation of the boost converter, the PWM signal is activated and deactivated when the second control signal is activated and deactivated, respectively, and wherein during the steady-state operation of the boost converter, the PWM signal transitions from the deactivated state to the activated state when the second control signal is activated, and from an activated state to a deactivated state when the second comparison signal is activated.

4. The system of claim 2, further comprising:
an analog-to-digital converter (ADC) that is configured to receive the input voltage associated with the boost converter, and generate an ADC output signal;
a look-up-table (LUT) that is coupled with the ADC, and is configured to receive the ADC output signal, and output a LUT output signal; and
a pulse generator that is coupled with the LUT, and is configured to receive the LUT output signal and first and second clock signals, and generate the second control signal, wherein the second control signal is generated such that a frequency of the second control signal is equal to a frequency of the second clock signal, and the fixed on-time duration and the fixed off-time duration of the second control signal are determined based on the LUT output signal and the first and second clock signals.

5. The system of claim 2, further comprising a first comparator that is configured to: (i) receive a sense signal and a first reference signal that are derived from the inductor current and the reference current, respectively, and (ii) compare the sense signal and the first reference signal to generate the first comparison signal, wherein the first comparison signal is activated when a voltage level of the sense signal is greater than or equal to a voltage level of the first reference signal, and deactivated when the voltage level of the sense signal is less than the voltage level of the first reference signal.

6. The system of claim 5, further comprising a second comparator that is configured to: (i) receive a ramp signal that is derived from the sense signal, (ii) receive a compensation signal that is derived from the input and output voltages associated with the boost converter, and (iii) compare the ramp signal and the compensation signal to generate the second comparison signal, wherein the second comparison signal is activated when a voltage level of the ramp signal is greater than or equal to a voltage level of the compensation signal, and deactivated when the voltage level of the ramp signal is less than the voltage level of the compensation signal.

7. The system of claim 6, further comprising a ramp generator that is configured to receive the sense signal, and generate the ramp signal.

8. The system of claim 6, further comprising:
a subtractor that is coupled with the boost converter, and is configured to receive the input and output voltages associated with the boost converter, and generate a subtractor output signal, wherein a voltage level of the subtractor output signal is equal to a difference between the input and output voltages; and
a voltage divider that is coupled with the subtractor, and is configured to receive the subtractor output signal, and generate a voltage divided signal, wherein a voltage level of the voltage divided signal is less than the voltage level of the subtractor output signal.

9. The system of claim 8, further comprising a compensator that is coupled with the voltage divider, and is configured to receive the voltage divided signal and a second reference signal, and generate the compensation signal based on a difference between the voltage level of the voltage divided signal and a voltage level of the second reference signal.

10. The system of claim 9, further comprising a switch that has: (i) a first terminal that is coupled with the compensator and the second comparator, and is configured to receive the compensation signal, (ii) a second terminal that is coupled with ground, and (iii) a control terminal that is configured to receive an inverted version of the first latch signal to control an activation and a deactivation of the switch.

11. The system of claim 10, further comprising an inverter, wherein the inverter has: (i) an input terminal that is configured to receive the first latch signal, and (ii) an output terminal that is configured to generate an inverted version of the first latch signal.

12. The system of claim 8, further comprising:
a third comparator that is coupled with the voltage divider, and is configured to: (i) receive the voltage divided signal and a third reference signal, and (ii) compare the third reference signal and the voltage divided signal to generate a third comparison signal, wherein the third comparison signal is activated when the voltage level of the voltage divided signal is equal to or greater than a voltage level of the third reference signal, and deactivated when the voltage level of the voltage divided signal is less than the voltage level of the third reference signal; and
a first latch that has:
a first input terminal that is coupled with ground;
a second input terminal that is coupled with the third comparator, and is configured to receive the third comparison signal; and
an output terminal that is configured to generate the first latch signal, wherein the first latch signal transitions from a deactivated state to an activated state when the third comparison signal is activated.

13. The system of claim 6, further comprising a first multiplexer that has:
first and second input terminals, wherein: (i) the first input terminal is coupled with the start-up controller, and is configured to receive the first control signal, and (ii) the second input terminal is configured to receive the second control signal;
a select terminal that is configured to receive the first latch signal; and
an output terminal that is coupled with the first and second comparators, and is configured to output, based on the first latch signal, one of the first and second control signals as a first multiplexer output signal, wherein the output terminal of the first multiplexer is further configured to provide the first multiplexer output signal to the first and second comparators to control operations of the first and second comparators.

14. The system of claim 2, wherein the PWM circuit includes:
a second multiplexer that has:
first and second input terminals that are configured to receive the first and second comparison signals, respectively;
a select terminal that is configured to receive the first latch signal; and
an output terminal that is configured to output, based on the first latch signal, one of the first and second comparison signals as a second multiplexer output signal; and
a third multiplexer that has:
first and second input terminals, wherein: (i) the first input terminal is coupled with the start-up controller, and is configured to receive the first control signal, and (ii) the second input terminal is configured to receive the second control signal;
a select terminal that is configured to receive the first latch signal; and
an output terminal that is configured to output, based on the first latch signal, one of the first and second control signals as a third multiplexer output signal.

15. The system of claim 14, wherein the PWM circuit further includes:
a second latch that has:
first and second input terminals that are coupled with the output terminals of the second and third multiplexers, and are configured to receive the second and third multiplexer output signals, respectively; and
an output terminal that is configured to generate a second latch signal; and
a logic gate that has:
first and second input terminals that are coupled with the output terminals of the third multiplexer and the second latch, and are configured to receive the third multiplexer output signal and the second latch signal, respectively; and
an output terminal that is coupled with the boost converter, and is configured to generate and provide the PWM signal to the boost converter.

16. The system of claim 1, wherein the start-up controller includes:
a first up counter that is configured to receive a first clock signal, and generate a first count, wherein the first count is incremented during each clock cycle of the first clock signal;
a down counter that is configured to receive a second clock signal, and generate a second count, wherein the second count is decremented during each clock cycle of the second clock signal, and wherein a frequency of the second clock signal is less than a frequency of the first clock signal; and a fourth comparator that is coupled with the first up counter and the down counter, and is configured to receive and compare the first and second counts to generate a fourth comparison signal, wherein the fourth comparison signal is deactivated when the first count is less than the second count, and activated when the first count is greater than or equal to the second count.

17. The system of claim 16, wherein the start-up controller further includes:
a second up counter that is coupled with the fourth comparator, and is configured to receive the fourth comparison signal and the first clock signal, and generate a third count, wherein the third count is incremented during each clock cycle of the first clock signal, and reset to a first predetermined value when the fourth comparison signal transitions from a deactivated state to an activated state; and
a fifth comparator that is coupled with the first and second up counters, and is configured to receive the third count and a reference count, and compare the third count and the reference count to generate a fifth comparison signal, wherein the fifth comparison signal is deactivated when the third count is less than the reference count, and activated when the third count is greater than or equal to the reference count, and wherein the first count is reset to a second predetermined value when the fifth comparison signal transitions from a deactivated state to an activated state.

18. The system of claim 17, wherein the start-up controller further includes a third latch that has:
first and second input terminals that are coupled with the fifth and fourth comparators, and are configured to receive the fifth and fourth comparison signals, respectively; and
an output terminal that is configured to generate the first control signal such that: (i) when the fourth comparison signal is activated, the on-time duration of the first control signal is fixed as the first control signal is activated, and (ii) when the fifth comparison signal is activated, the off-time duration of the first control signal is dynamic as the first control signal is deactivated.

19. The system of claim 1, wherein the inductor current is controlled by way of the PWM signal such that the inductor current increases when the PWM signal is activated, and decreases when the PWM signal is deactivated.

20. An electronic circuit board, comprising:
a boost converter; and
a system that is configured to control an inductor current of the boost converter, the system comprising:
a start-up controller that is configured to generate a first control signal such that an on-time duration of the first control signal is fixed and an off-time duration of the first control signal is dynamic; and
a pulse width modulation (PWM) circuit that is coupled with the start-up controller and the boost converter, wherein the PWM circuit is configured to: (i) receive the first control signal, and a first comparison signal that is generated based on a comparison of the inductor current and a reference current, and (ii) generate and provide a PWM signal to the boost converter to control the inductor current of the boost converter, and wherein during a start-up of the boost converter, the PWM signal transitions from a deactivated state to an activated state when the first control signal is activated, and from the activated state to the deactivated state when the first comparison signal is activated.

\* \* \* \* \*